United States Patent
Zalewski et al.

(10) Patent No.: US 7,032,126 B2
(45) Date of Patent: Apr. 18, 2006

(54) METHOD AND APPARATUS FOR CREATING A STORAGE POOL BY DYNAMICALLY MAPPING REPLICATION SCHEMA TO PROVISIONED STORAGE VOLUMES

(75) Inventors: Stephen H. Zalewski, Pleasant Hill, CA (US); Aida McArthur, Sunnyvale, CA (US)

(73) Assignee: Softek Storage Solutions Corporation, Vienna, VA (US)

( * ) Notice: Subject to any disclaimer, the term of this patent is extended or adjusted under 35 U.S.C. 154(b) by 160 days.

(21) Appl. No.: 10/617,203

(22) Filed: Jul. 8, 2003

(65) Prior Publication Data

US 2005/0028025 A1    Feb. 3, 2005

(51) Int. Cl.
*G06F 11/00* (2006.01)
(52) U.S. Cl. .......................................... 714/7; 711/133
(58) Field of Classification Search .................... 714/7, 714/8, 15, 18, 42, 54; 711/133, 134, 159, 711/162
See application file for complete search history.

(56) References Cited

U.S. PATENT DOCUMENTS

| | | | | |
|---|---|---|---|---|
| 5,673,382 A | * | 9/1997 | Cannon et al. | 714/6 |
| 6,148,412 A | * | 11/2000 | Cannon et al. | 714/6 |
| 6,166,784 A | * | 12/2000 | Murata et al. | 349/1 |
| 6,266,784 B1 | | 7/2001 | Hsiao et al. | |
| 6,393,516 B1 | * | 5/2002 | Johnson | 711/111 |
| 2004/0088382 A1 | * | 5/2004 | Therrien et al. | 709/219 |
| 2004/0123029 A1 | * | 6/2004 | Dalal et al. | 711/114 |
| 2004/0181707 A1 | * | 9/2004 | Fujibayashi | 714/6 |
| 2005/0010529 A1 | * | 1/2005 | Zalewski et al. | 705/54 |

OTHER PUBLICATIONS

PCT/US04/21520 International Search Report.

* cited by examiner

*Primary Examiner*—Nadeem Iqbal
(74) *Attorney, Agent, or Firm*—Kenyon & Kenyon LLP

(57) ABSTRACT

A method and apparatus for creating a dynamic storage pool for data recovery, is presented. The method may include determining amount of an available storage area, identifying storage capabilities of the available storage area, selecting a protection policy scheme for replication of an application server data based on the identified storage capabilities, provisioning a volume from the available storage area to the application server data, and replicating the application server data based on the selected protection policy scheme for storage to the available storage area.

29 Claims, 4 Drawing Sheets

METHOD AND APPARATUS FOR CREATING A STORAGE POOL BY DYNAMICALLY MAPPING REPLICATION SCHEMA TO PROVISIONED STORAGE VOLUMES

CROSS REFERENCE TO RELATED APPLICATIONS

This application is related by common inventorship and subject matter to co-filed and co-pending applications titled "Method and Apparatus for Determining Replication Schema Against Logical Data Disruptions", "Methods and Apparatus for Building a Complete Data Protection Scheme", "Method and Apparatus for Protecting Data Against any Category of Disruptions" filed Jul. 8, 2003. Each of the aforementioned applications is incorporated herein by reference in its entirety.

1. Technical Field of the Invention

The present invention relates to a method and apparatus for creating a storage pool in an open, heterogeneous computing environment, and more particularly, a method for providing a data storage environment with increased data availability and reliability.

2. Background Information

The expansion of storage area networks (SANs), growth of companies, and increased data production from business processes and procedures have become prime contributors to growth in factors that cause data loss. These common risk factors include hardware failures, human errors, software malfunctions, viruses, and natural disasters.

While traditional server backup solutions range from tape-based backup to mirroring, online network backup has emerged as the most efficient form of data protection. Managing online replications becomes an integral part of an organization's business continuity in terms of service requirements for data availability, recovery time, disaster avoidance, and cost reduction.

SUMMARY OF THE INVENTION

A method and apparatus for creating a dynamic storage pool for data recovery, is presented. The method may include determining amount of an available storage area, identifying storage capabilities of the available storage area, selecting a protection policy scheme for replication of an application server data based on the identified storage capabilities, provisioning a volume from the available storage area to the application server data, and replicating the application server data based on the selected protection policy scheme for storage to the available storage area.

BRIEF DESCRIPTION OF THE DRAWINGS

The invention is described in detail with reference to the following drawings wherein like numerals reference like elements, and wherein.

DETAILED DESCRIPTION OF THE PREFERRED EMBODIMENTS

Figure 1:
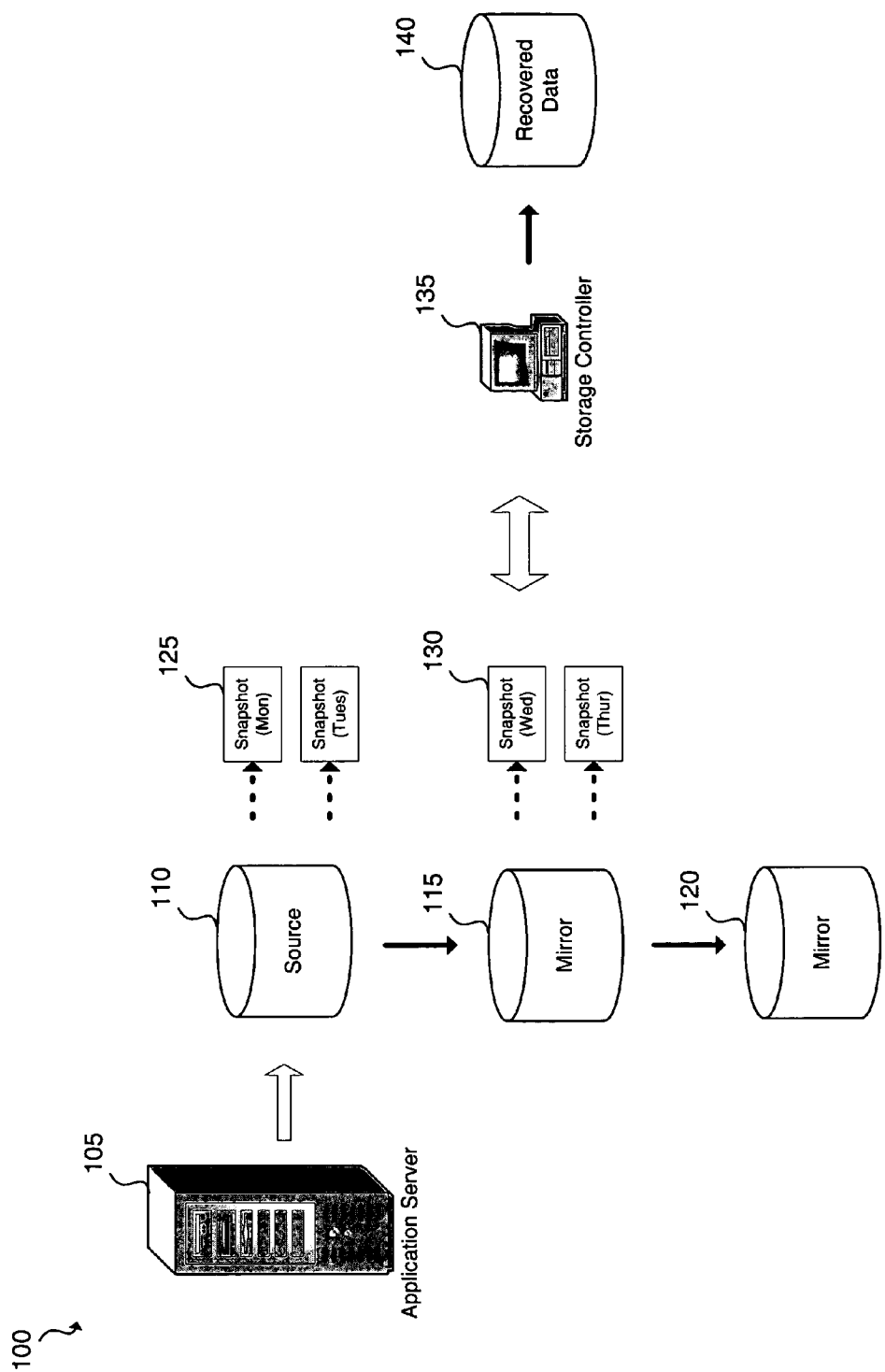
FIG. 1 is a diagram of a possible data replication and recovery management system employing an embodiment of the present invention.

In order to recover data, an information technology (hereinafter, "IT") department must not only protect data from hardware failure, but also from human errors and such. Overall, the disruptions can be classified into two broad categories: "physical" disruptions, that can be solved by mirrors to address hardware failures; and "logical" disruptions that can be solved by a snapshot or a point-in-time (hereinafter, "PIT") copy for instances such as application errors, user errors, and viruses. This classification focuses on the particular type of disruptions in relation to the particular type of replication technologies to be used. The classification also acknowledges the fundamental difference between the dynamic and static nature of mirrors and PIT copies. Although physical and logical disruptions have to be managed differently, the invention described herein manages both disruption types as part of a single solution.

Strategies for resolving the effects of physical disruptions call for following established industry practices, such as setting up several layers of mirrors and the use of failover system technologies. Mirroring is the process of copying data continuously in real time to create a physical copy of the volume. Mirrors contribute as a main tool for physical replication planning, but it is ineffective for resolving logical disruptions.

Strategies for handling logical disruptions include using snapshot techniques to generate periodic PIT replications to assist in rolling back to previous stable states. Snapshot technologies provide logical PIT copies of volumes of files. Snapshot-capable volume controllers or file systems configure a new volume but point to the same location as the original. No data is moved and the copy is created within seconds. The PIT copy of the data can then be used as the source of a backup to tape, or maintained as is as a disk backup. Since snapshots do not handle physical disruptions, both snapshots and mirrors play a synergistic role in replication planning.

In order to determine what data has to be replicated, the mainframe environment has used the concept of data criticality to identify and prioritize applications. Constant reevaluation of data criticality is reflected in changes to recovery management and overall business continuity. This bottom-up technique works well in homogenous mainframe markets. On the other hand, heterogeneous open system environments cannot use this technique because of the lack of common mechanisms to determine the relationship between data and application.

Furthermore, in mainframe environments, storage pools have availability and recovery requirements that are implemented at the space management stage. This means that empty volumes that have not been provisioned to an application have active replication policies in place for logical and physical protection. Multiple storage pools can be created, each with a different policy, but each pool is static in nature. All resources are pre-allocated to implement the policies for these standing pools. This approach has advantages that cause it to work well in a closed homogenous environment, such as those found within mainframes.

In open systems, applications are much more diverse. No two are likely to have the same data protection requirements. In an open system example, trying to apply the mainframe concept of storage pool backups would lead to a very costly storage system with slow performance for two reasons. First, applications have to be suspended or stopped to execute a logical protection policy. This also implies awareness by the software of the applications, and how they can be stopped or synchronized. Second, because of the requirement that a single replication policy must be established for different applications within each pool, an inappropriate choice of resources from amongst the available storage volumes would frequently occur.

For open systems, this static approach creates a very inefficient model for utilizing storage pools. Given the variety of application servers that are likely to be deployed, it is unlikely that they have availability and recoverability requirements that are common enough to make implementing the policies at the empty volume stage either cost effective or appropriate for the application.

Recognizing that each data loss factor has unique characteristics, this method and apparatus can solve the majority of cases using a general technique, bringing simplicity to storage environments, while increasing data availability and reliability. More importantly, physical and logical disruptions are treated equally as part of a complete data protection plan.

Instead of having static storage pools, as in a mainframe environment (described above), the replication policies are dynamic. They are implemented at the storage management stage, when volumes are provisioned to each application server deployed. At this stage, the unique requirements for the application server are known. For open systems, the relationship between the data and application is achieved at the storage management and provisioning stage. Applications and, subsequently, volumes can be prioritized.

This technique offers a high degree of confidence in the ability to restore the data. It results in very appropriate strategies for physical and logical failures, and a very cost-effective use of storage. In addition, this approach supports much more flexibility in evaluating the scope of storage replication technologies that are available and appropriate for the specific application server. Storage pools, instead of being static storage pools, utilize highly adaptive protection policies that are not implemented until each application server is deployed. More specifically, they are managed independently to an application. This allows for a vastly greater number of storage pools than in the mainframe case, but in actual employment for any given enterprise, an IT department will likely select only a limited number of storage pool policy templates to be used in data recovery management. These templates, designed as adaptive protection policies against specific disruptions types, together as a whole form a protection policy schema.

Referring to FIG. 1, a diagram of a possible data replication and recovery management system employing an embodiment of the present invention is shown. In storage network 100, application server 105 is deployed in the open system. Concurrently, an available storage volume is provisioned to the data generated by application server 105 as data source 110.

Depending on the protection policy schema put into place by the user (using any given number of protection policy templates), the most appropriate available storage volume is provisioned to the data from application server 105. The appropriate storage volume is determined having ascertained each volume's capabilities including, but not limited to, storage capacity, performance, read/write and input/output speeds. Source 110 is the source of data to be replicated under the protection policy schema determined by the user for recovery management. The replication technologies include, but are not limited to, a mirrored volume, mirrors 115, 120 and a variety of snapshots in type and number, snapshots 125, 130.

Depending on the type of protection policy selected, the user can manage the replication and recovery of data from storage controller 135. The storage controller 135 may be any processor or computer capable of running the data replication and recovery management application with access to the storage network 100. Possible storage controllers 135 include, but are not limited to, a personal computer, a host switch, a network appliance, or a disk controller. Depending on the type of disruption involved, physical, logical or combined, the user can select the best template for recovery of data. The user can choose to recover from snapshots 125 or 130 in the event of a logical disruption, or from mirrors 115 or 120 in the event of a physical disruption. Since a wide variety of factors are involved in determining which template should be used for recovery including, but not limited to, the level of criticality of the data and the length of time data is inaccessible during recovery, the present invention provides the user flexibility with regards to how, what, and when data is recovered after a disruption occurs. Multiple templates can typically be utilized in the overall protection policy schema for a system to insure full data recovery in a minimum amount of time. Furthermore, the present invention enables the user to identify through storage controller 135, the level of protection available based on the storage capacity and capabilities of the system. Ultimately, recovered data 140 is retrieved through storage controller 135 by utilizing a myriad of replication technologies as exemplified in mirrors 115, 120 and snapshots 125, 130.

Figure 2:
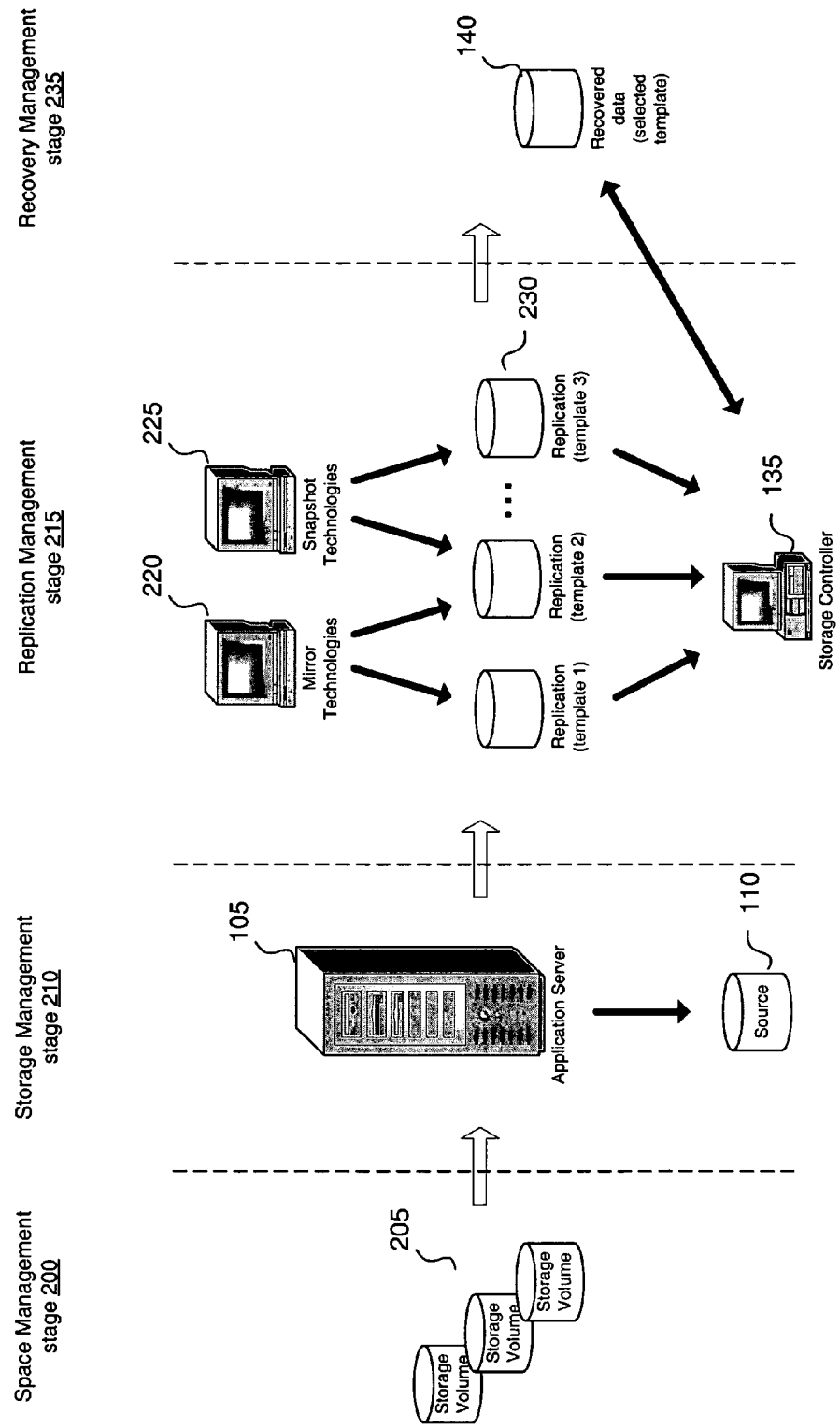
FIG. 2 is a diagram of a possible data replication and recovery management system utilizing dynamically mapped storage pools employing an embodiment of the present invention.

Referring to FIG. 2, a diagram of a possible data replication and recovery management system utilizing dynamically mapped storage pools employing an embodiment of the present invention is shown. At the space management stage 200, the available storage area is determined. Available storage volumes 205 are evaluated in terms of capabilities, both in capacity and system performance. At the storage management stage 210, an application server 105 is deployed. Based on the user selected protection policy schema, an appropriate storage volume is provisioned to store data source 110. A variety of templates may be utilized on the overall protection policy schema chosen by the user. At the replication management stage 215, a wide variety of replication technologies can be implemented, including mirror technologies 220 and snapshot technologies 225, which produce PIT and mirrored replications 230. Replications 230 are stored and managed by storage controller 135. At the recovery management stage 235, in the event of a disruption, storage controller 135 can retrieve the recovered data 140 as required, with the user selecting the most appropriate template for recovery.

Figure 3A:
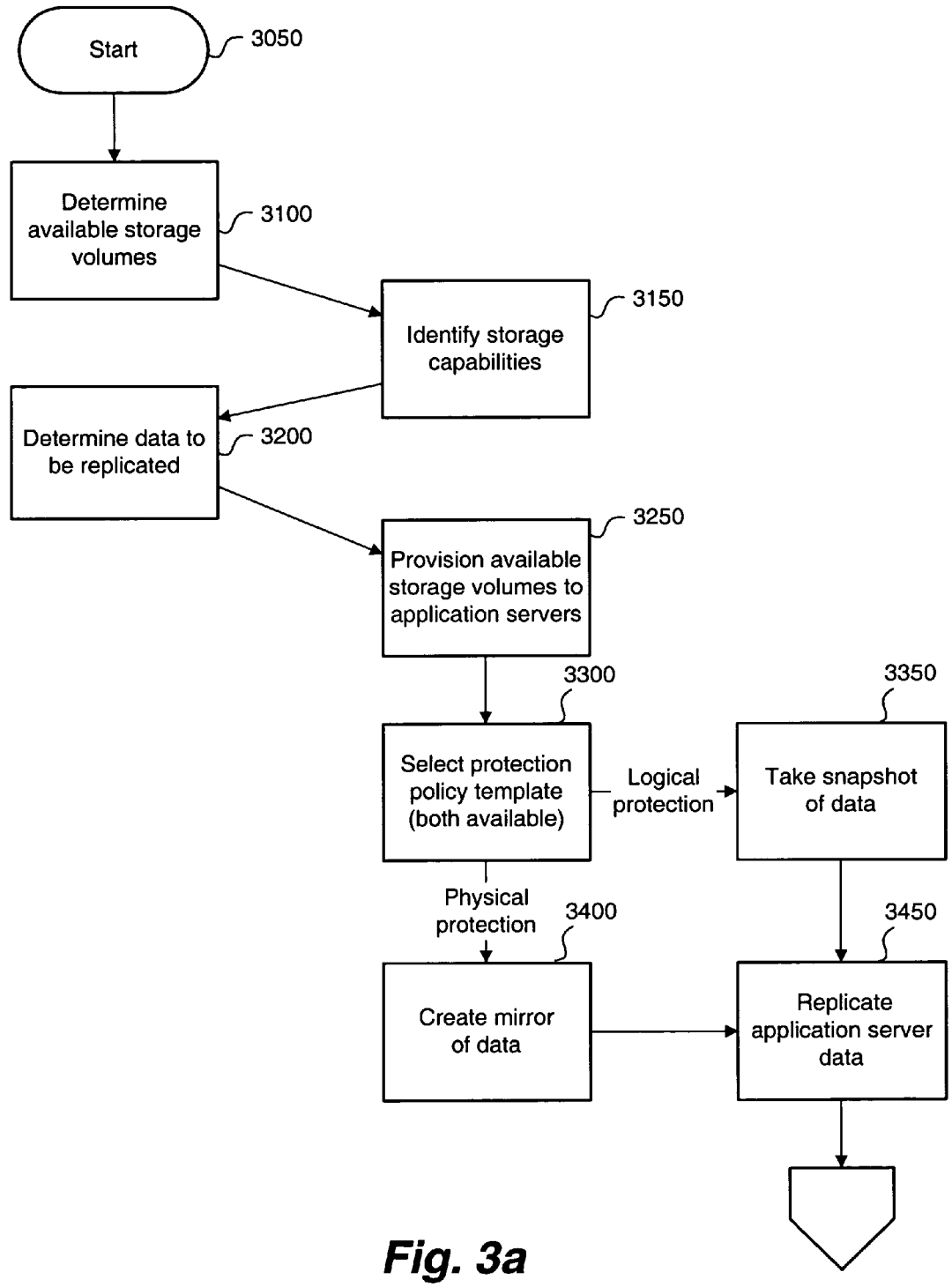
FIGS. 3a and 3b is a possible flow diagram of the method of creating storage pools employing an embodiment of the present invention.
Figure 3B:
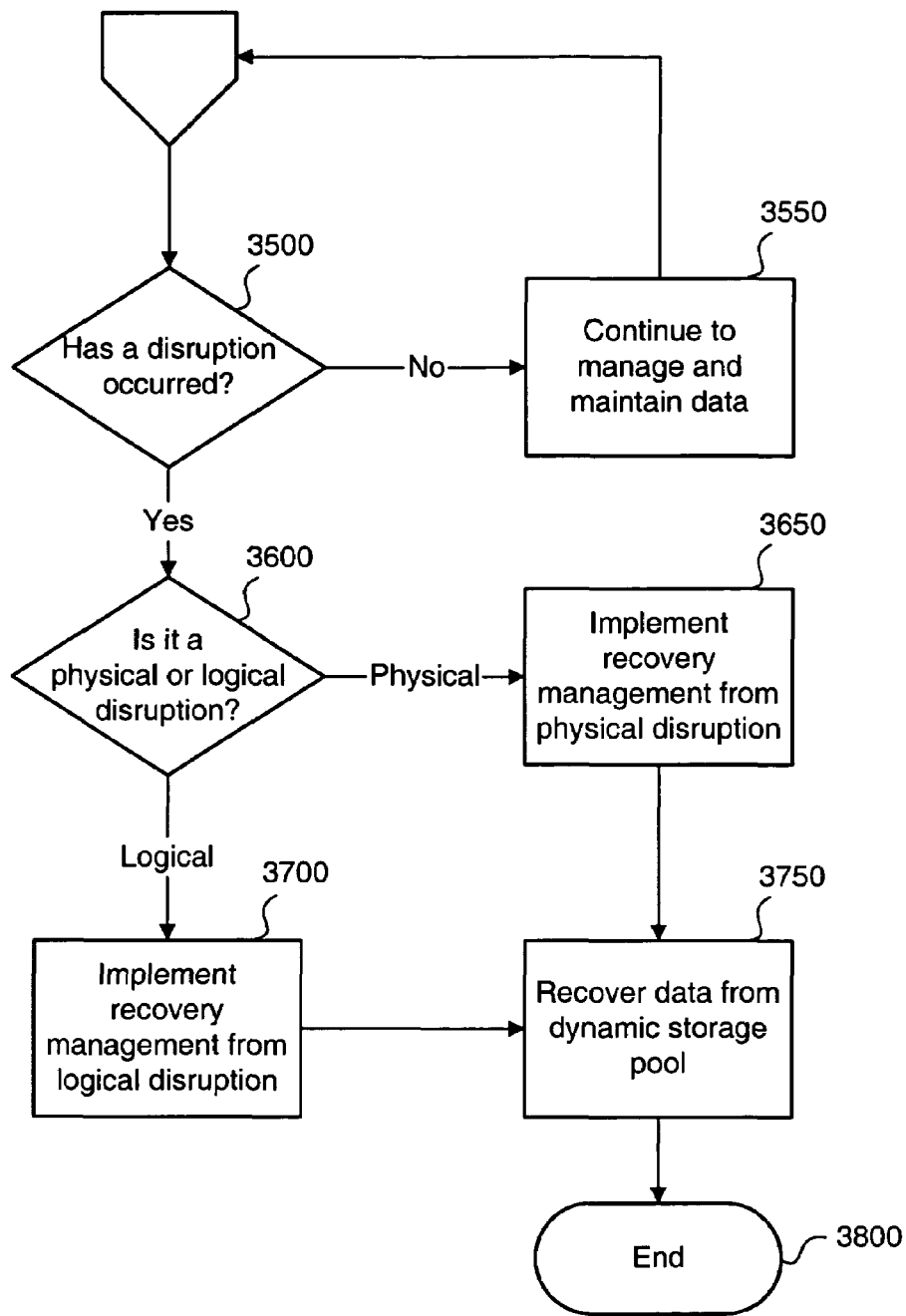

Referring to FIGS. 3a and 3b, a possible flow diagram of the method of creating storage pools employing an embodiment of the present invention is shown.

The process begins at step 3050 and continues to step 3100, where storage controller 135 determines the available storage volumes at the space management stage 200. All storage resources are sought out for availability in replication planning, including various storage media, or memory. This memory may include a hard disk drive, a removable disk drive, a tape, an EEPROM, or other memory storage devices. Storage area discovery continues in step 3150. In step 3150, storage controller 135 determines the storage capabilities of the available storage volumes. These capabilities include, but are not limited to, the storage capacity, performance, read/write and input/output speeds.

The storage controller 135 forwards control to step 3200, the storage management stage 210, where the data to be replicated is determined based on the application servers 105 deployed in the environment. When an application server 105 is deployed, the storage controller 135 immediately provisions a storage volume 205, in step 3250, based on the user selected protection policy schema. This provisioning step provides the most appropriate storage for data generated by the application server 105. Available storage volumes 205 are constantly provisioned in order to provide for the continuous generation of business data in source 110 by the various application servers 105 that are deployed.

In step 3300, the storage controller 135 applies the protection policy templates 230 from the user-selected schema. Based on the user's preference and overall schema selection for protection against logical and/or physical disruptions, particular replication technologies are utilized. In step 3350, the storage controller 135 may select a template that protects against logical disruptions and provides a snapshot 125, 130 or multiple snapshots of the data 125 and 130 or other logical disruption replication technology. In step 3400, the storage controller 135 may select a template that protects against physical disruptions and completes a mirror process 115, 120 or other physical disruption replication technology. If a template protects against both types of disruption, calling for both physical and logical protection, control passes to both steps 3350 and 3400, where the storage controller 135 utilizes a variety of replication technologies 220 and 225 as described above.

In any event, control is forwarded to the replication management stage 215, in step 3450, where the storage controller 135 replicates the application server data 230 to complete any number of protection policy templates from the schema chosen by the user.

At the recovery management stage 235, in decision step 3500, the storage controller 135 determines whether a disruption has occurred. If a disruption has not occurred, the storage controller 135 continue to manage and maintain data, in step 3550, depending on the overall protection schema chosen by the user. If a disruption has occurred, the storage controller 135 determines what type of disruption has occurred in decision step 3600, a physical or logical disruption. Depending on the type of disruption, the user may utilize storage controller 135 to implement the appropriate protection policy template or templates to recover the data 140 as quickly and completely as needed. If a physical disruption occurs, the user may select to recover the data utilizing a protection policy template designed to recover data from various physical disruptions, in step 3650. Likewise, if a logical disruption occurs, the user may select to recover the data utilizing a template designed against various logical disruptions, in step 3700. Furthermore, a user can select to recover data from a template designed to protect against both types of disruptions, implementing both steps 3650 and 3700. Whichever template the user selects, control passes to step 3750, where the recovered data 140 is retrieved from the dynamic storage pool, ending the process in step 3800.

As shown in FIGS. 1 and 2, the method of this invention may be implemented using a programmed processor. However, the method can also be implemented on a general-purpose or a special purpose computer, a programmed microprocessor or microcontroller, peripheral integrated circuit elements, an application-specific integrated circuit (ASIC) or other integrated circuits, hardware/electronic logic circuits, such as a discrete element circuit, a programmable logic device, such as a PLD, PLA, FPGA, or PAL, or the like. In general, any device capable of implementing the flowcharts shown in FIGS. 3a and 3b can be used to implement the data protection and recovery functions of this invention.

While the invention has been described with reference to the above embodiments, it is to be understood that these embodiments are purely exemplary in nature. Thus, the invention is not restricted to the particular forms shown in the foregoing embodiments. Various modifications and alterations can be made thereto without departing from the spirit and scope of the invention.

What is claimed is:

1. A method of creating a dynamic storage pool for data recovery, comprising:
   determining an amount of an available storage area;
   identifying storage capabilities of the available storage area;
   selecting a protection policy scheme for replication of an application server data based on the identified storage capabilities;
   provisioning a volume from the available storage area for the application server data; and
   replicating the application server data based on the selected protection policy scheme for storage to the available storage area.

2. The method of claim 1, wherein identifying storage capabilities further comprises:
   identifying storage capacity of the available storage area; and
   identifying storage performance of the available storage area.

3. The method of claim 2, wherein the available storage area is comprised of at least one storage volume.

4. The method of claim 1, wherein the protection policy scheme is selected based on a user decision.

5. The method of claim 1, wherein the protection policy scheme includes at least one protection policy template.

6. The method of claim 1, wherein provisioning a volume from the available storage area further comprises:
   selecting the volume based on an identified storage capacity and storage performance of the available storage area.

7. The method of claim 6, wherein provisioning a volume from the available storage area occurs when each application server is deployed.

8. The method of claim 1, wherein replicating the application server data occurs for each application server deployed.

9. A storage management and data recovery system, comprising:
   at least one application server to generate data;
   an available storage area to backup the data generated by the at least one application server; and
   a storage controller that determines an amount of an available storage area, identifies storage capabilities of the available storage area, selects a protection scheme for the data generated from the at least one application server, provisions a selected volume from the available storage area for the application server data, manages replication of the data generated from the at least one application server based on the selected protection policy scheme, and creates a storage pool of data replicated from the data generated from the at least one application server.

10. The system of claim 9, wherein the storage controller identifies storage capabilities of the available storage area by further identifying storage capacity of the available storage area, and identifying storage performance of the available storage area.

11. The system of claim 10, wherein the available storage area is comprised of at least one storage volume.

12. The system of claim 9, wherein the storage controller selects the protection policy scheme based on a user decision.

13. The system of claim 9, wherein the protection policy scheme includes of at least one protection policy template.

14. The system of claim 9, wherein the storage selects the volume to provision based on an identified storage capacity and storage performance of the available storage area.

15. The system of claim 14, wherein provisioning a volume from the available storage area occurs when each application server is deployed.

16. The system of claim 9, wherein replicating the application server data occurs for each application server deployed.

17. A set of instructions residing in a storage medium, said set of instructions capable of being executed by a processor to implement a method creating a dynamic storage pool for data recovery, comprising:
   determining an amount of an available storage area;
   identifying storage capabilities of the available storage area;
   selecting a protection policy scheme for replication of an application server data based on the identified storage capabilities;
   provisioning a volume from the available storage area for the application server data; and
   replicating the application server data based on the selected protection policy scheme for storage to the available storage area.

18. The set of instructions of claim 17, wherein identifying storage capabilities further comprises:
   identifying storage capacity of the available storage area; and
   identifying storage performance of the available storage area.

19. The set of instructions of claim 18, wherein the available storage area is comprised of at least one storage volume.

20. The set of instructions of claim 17, wherein the protection policy scheme is selected based on a user decision.

21. The set of instructions of claim 17, wherein the protection policy scheme includes at least one protection policy template.

22. The set of instructions of claim 17, wherein provisioning a volume from the available storage area further comprises:
   selecting the volume based on an identified storage capacity and storage performance of the available storage area.

23. The set of instructions of claim 22, wherein provisioning a volume from the available storage area occurs when each application server is deployed.

24. The set of instructions of claim 17, wherein replicating the application server data occurs for each application server deployed.

25. In a data recovery management system including at least one application server generating data to an available storage area connected to a storage controller, a method of recovering data from a storage pool, comprising:
   selecting a protection policy scheme for replication of the generated data;
   determining a storage volume from the available storage area to be used for replicating the generated data;
   provisioning the volume for the generated data;
   replicating the data according to the selected protection policy scheme; and
   recovering the data from the replicated data.

26. The method of claim 25, wherein the protection policy scheme is selected based on a user decision.

27. The method of claim 25, wherein determining a storage volume to be used for replicating the generated data comprises:
   identifying storage capacity of the available storage area; and
   identifying storage performance of the available storage area.

28. The method of claim 25, wherein the protection policy scheme includes at least one protection policy template.

29. The method of claim 28, wherein recovering the data from the replicated data further comprises:
   managing the replicated data according to the selected protection policy scheme; and
   selecting from among the at least one protection policy template for recovery the data.

* * * * *